United States Patent [19]

Orain

[11] Patent Number: 4,482,336
[45] Date of Patent: Nov. 13, 1984

[54] HOMOKINETIC TRIPOD JOINT AND THE APPLICATION OF THE JOINT IN A WHEEL HUB STRUCTURE

[75] Inventor: Michel A. Orain, Conflans-Ste-Ho Norine, France

[73] Assignee: Glaenzer Spicer, Poissy, France

[21] Appl. No.: 344,934

[22] Filed: Feb. 2, 1982

[30] Foreign Application Priority Data

Feb. 9, 1981 [FR] France ................... 81 02465

[51] Int. Cl.³ .................. B60K 17/30; F16D 3/30
[52] U.S. Cl. .................... 464/111; 180/255; 464/905
[58] Field of Search ............. 180/255, 258; 464/111, 464/905

[56] References Cited

U.S. PATENT DOCUMENTS

| | | | |
|---|---|---|---|
| 4,175,407 | 11/1979 | Orain | 464/111 |
| 4,178,778 | 12/1979 | Orain | 464/111 |
| 4,275,799 | 6/1981 | Guimbretiere | 464/905 X |
| 4,318,282 | 3/1982 | Orain | 464/111 |

FOREIGN PATENT DOCUMENTS 55-54721 4/1980 Japan ........................ 464/111
1480039 7/1977 United Kingdom .

Primary Examiner—Stuart S. Levy
Assistant Examiner—Daniel P. Stodola
Attorney, Agent, or Firm—Wenderoth, Lind & Ponack

[57] ABSTRACT

A homokinetic tripod joint includes a first element connected to rotate with a tripod element having rollers and a second element having runways for the rollers. The first and second elements form a ball and socket connection with the first and second elements having, respectively, complementary concave and convex spherical surfaces. The joint includes a bayonet connection having recesses in the concave spherical surface of the first element and corresponding segments on the convex spherical surface of the second element the joint also includes an abutment member having a convex spherical surface with a shape complementary to the second element.

7 Claims, 4 Drawing Figures

HOMOKINETIC TRIPOD JOINT AND THE APPLICATION OF THE JOINT IN A WHEEL HUB STRUCTURE

BACKGROUND OF THE INVENTION

The present invention relates to homokinetic joints of the tripod type and to applications thereof in particular in vehicle wheel hubs.

The invention more particularly relates to homokinetic tripod joints of the type comprising a first element connected to rotate with a tripod element which defines three trunnions on which are rotatably and slidably mounted three spherical rollers, and a second element defining three runways for the rollers, the first element and the second element comprising respectively concave and convex complementary spherical surfaces which cooperate with each other so as to form a ball and socket connection, the rotational connection between the first element and the tripod element constituting in addition an auxiliary homokinetic coupling. Such a joint is described for example in French Pat. No. 77 06 428 filed on Mar. 4, 1977 by the Firm Glaenzer Spicer. These joints may be employed advantageously in automobile vehicle wheel hubs since they are particularly compact and need not be cooled by a current of relative air.

There is also known from French Pat. No. 1,175,941 a joint of the type having a bisecting plane comprising two elements constituting a ball and socket articulation each of which elements is connected to a shaft and in which elements grooves are formed. This joint is completed by a spider having three branches which extend into the grooves of the two elements and are interconnected to pivot about a pin at their inner ends. In this joint, the two elements forming the ball and socket articulation are maintained axially by a coupling of the bayonet type. However, the assembly thereof is complicated because the two elements must be engaged one inside the other in the absence of the branches of the spider which are placed in position only after the fitting together and alignment of the elements, this operation being followed by the placing in position of the pivot pin of the spider which requires, in one embodiment, the provision of a hollow shaft rigid with one of the two elements. Moreover, in such an arrangement, the prevention of relative rotation of the two elements concerned in the bayonet coupling is achieved by the branches of the spider which is possible only in this type of joint where the branches of the spider extend into grooves formed in the inner element and in the outer element.

Such an arrangement has drawbacks in an application such as an automobile vehicle hub and is difficult to manufacture on an industrial scale.

SUMMARY OF THE INVENTION

An object of the invention is to provide a tripod joint of the type defined hereinbefore, whose assembly is particularly simple and which consequently lends itself to mass-production.

The invention accordingly provides a homokinetic tripod joint of the type defined hereinbefore wherein the first element and second element are rendered axially connected to each other by means of a connection of the bayonet type and the connection in rotation between the first element and the tripod element is achieved by means of complementary teeth which may be disengaged from each other by a relative axial displacement.

According to other features:

the convex spherical surface of the second element is divided into three segments of a sphere separated by cavities and the concave spherical surface of the first element is interrupted by three recesses which open onto the free edge of the first element, the angle subtended at the centre thereby exceeding the angle subtended at the centre by the segments of a sphere;

the first element is open at the end thereof remote from the second element and means for axially retaining the tripod element are provided at such open end;

such axial retaining means define an abutment of spherical shape for the tripod element which includes an abutment of complementary shape;

axial abutment means are provided between the rollers and the second element;

this axial abutment means comprise shoulders which cooperate with the inner face of the rollers so as to retain the rollers in the runways for an extreme breaking angle of the joint.

The joint of the invention is assembled by placing the tripod element and the rollers therefor in the second element, the rollers being received in the runways therefor, engaging the second element in the first element, the two elements being then in alignment and occupying a relative angular position which assembled by placing direction away from the second element so as to disengage the complementary means for the connection in rotation provided between the tripod element and the first element, rotating the second element relative to the first element so as to lock the bayonet connecting means, returning the tripod element toward the second element so as to bring the complementary means for connection in rotation into engagement, then placing the means for axially retaining the tripod in position on the first element.

In another stage prior to such method, abutment means are placed in position between the rollers and the second element.

Another object of the invention is to provide an application of such a joint in an automobile vehicle wheel hub.

BRIEF DESCRIPTION OF THE DRAWINGS

The invention will be described in more detail hereinafter with reference to the accompanying drawings which are given merely by way of example and in which.

DETAILED DESCRIPTION OF THE INVENTION

Figure 1:
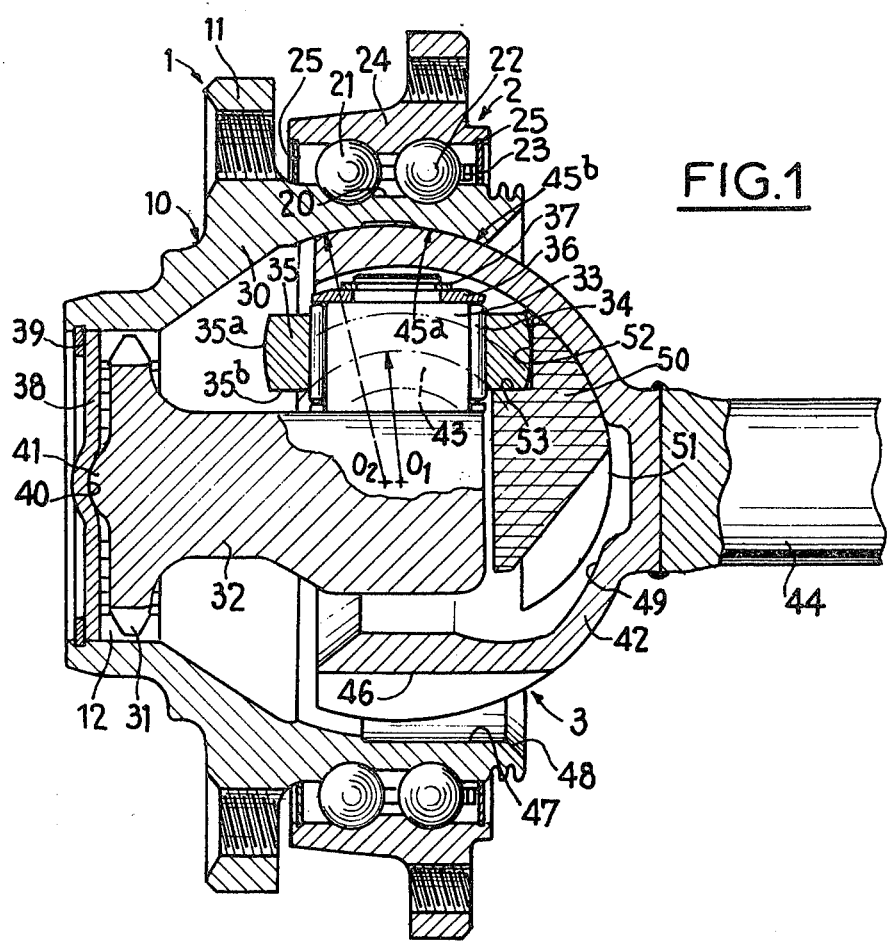
FIG. 1 is a longitudinal sectional view of a wheel hub equipped with a homokinetic joint according to the invention.

FIG. 1 is an assembly view of a driving wheel hub for an automobile vehicle comprising a hub 1 proper, a rolling bearing 2, and a homokinetic joint 3. In this embodiment, a single element 10 defines a wheel-carrying flange 11, an inner race 20 of the rolling bearing and a first element 30 of the homokinetic tripod joint.

The bearing is here of the type comprising two rows of balls 21, 22 which are held spaced apart from each other by a cage 23 and circulate between the inner race 20 and an outer race 24, the bearing being sealed by lateral sealing elements 25.

The hub comprises inner splines 12 which are adapted to cooperate with outer teeth 31 formed on a shaft section 32 which constitutes the tripod element. Indeed, this shaft section comprises three trunnions 33 disposed at 120° from each other and on which are mounted by means of needles 34 three spherical-shaped rollers 35. The needles are maintained on the journal by a washer 36 and an elastically yieldable ring 37.

The means for axially retaining the tripod element relative to the hub comprise an abutment and closing plate 38 which is held in position by an elastically yieldable ring 39 and which defines on the axis of the hub a spherical recess 40 in which is received a projection 41 of complementary shape provided on the end of the tripod element.

The second part of the joint is constituted by a bowl-shaped element 42 which defines three runways 43 which have a circular cross-sectional shape and receive the rollers. The mean line of each runway is also circular and has a centre $O_1$ which is located on the axis of the bowl-shaped element 42 connected to a transmission shaft 44.

The element 30 and the element 42 define complementary spherical surfaces 45a, 45b which constitute a ball and socket connection.

Figure 2:
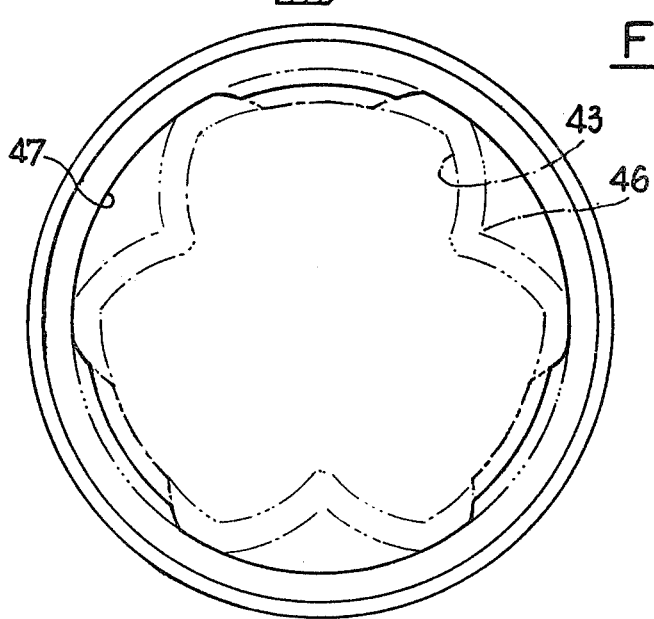
FIG. 2 is a partial end elevational view of the elements of this joint.
Figure 3:
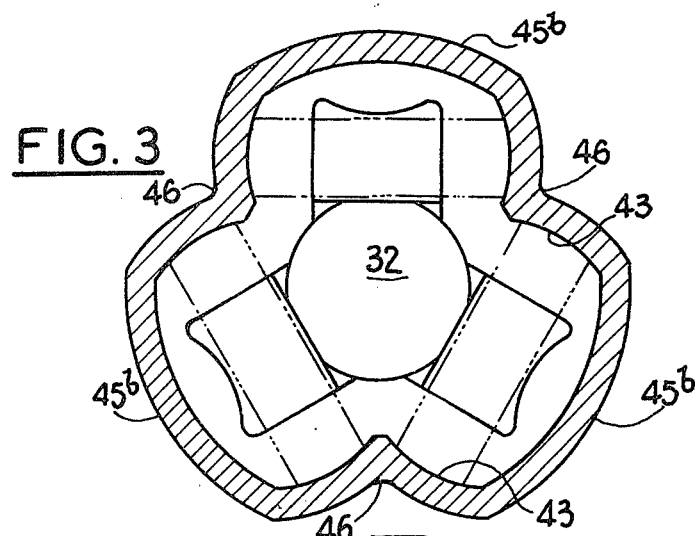
FIG. 3 is a cross-sectional view of another element of the joint.

The convex spherical surface 45b defined by the bowl-shaped element is divided into three segments of a sphere separated by cavities 46 (FIGS. 2 and 3). The concave spherical surface 45a of the element 30 is interrrupted by three recesses 47 which open onto the free edge 48 of this element facing the transmission shaft, the angle subtended at the centre by these recesses exceeding the angle subtended at the centre by the concave segments of a sphere 45b so as to permit the assembly of the joint. This arrangement constitutes a bayonet type retaining device between the element 30 and the bowl-shaped element 42.

Disposed between the rollers 35 and the inner end 49 of the bowl-shaped element, which constitutes a spherical bearing surface, is an abutment member 50 of plastics material which has a convex spherical surface 51 whose shape is complementary to that of the inner end of the bowl-shaped element. This abutment member comprises, on one hand, radial surfaces 52 against which bear the lateral surfaces 35a of the rollers, and, on the other hand, axial shoulders 53 against which the inner surfaces 35b of the rollers may bear.

Figure 4:
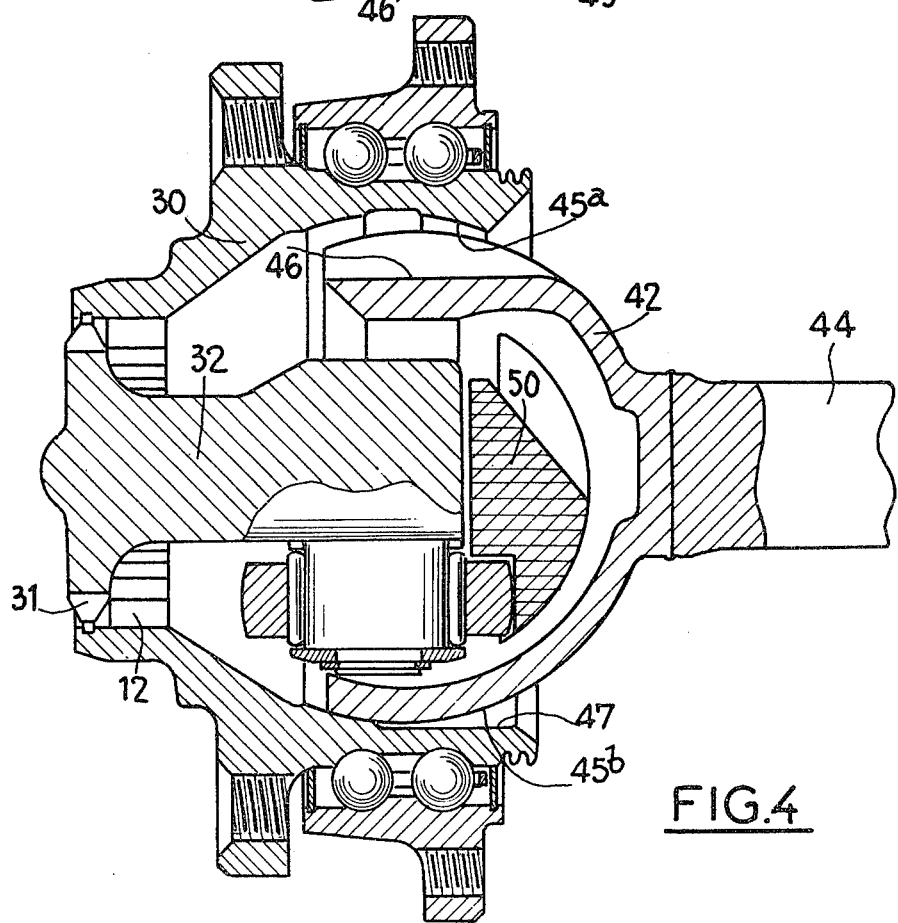
FIG. 4 is a view similar to FIG. 1 of the joint in an intermediate assembly position.

The structure just described is assembled in the following manner:

A sub-assembly constituted by the bowl-shaped element 42, the tripod element 32 and the abutment member 50, is inserted in the element 30 from the right as viewed in FIG. 4, the bowl-shaped element 42 and the element 30 occupying an relative angular position which is offset 60° relative to that of the FIGS. 1 and 2 and therefore corresponding to FIG. 4. In this position, the convex segments 45b of the bowl-shaped element are able to enter the recesses 47 of the element 30.

The tripod element 32 is then brought to the position shown in FIG. 4, in which the teeth 31 are disengaged from the splines 12, the abutment member 50 being spaced away from the spherical inner end of the bowl-shaped element. The complementary spherical surfaces 45a, 45b of the element 30 and the bowl-shaped element 42 are in contact and the bowl-shaped element is rotated through 60° with respect to the hub so as to put it back into "phase" as illustrated in FIGS. 1 and 2. Then the tripod element 32 is urged axially toward the right as viewed in the drawing so as to bring the complementary spherical surfaces of the abutment member 50 and the bowl-shaped element into contact, at the same time as the teeth 31 and the splines 12 are engaged with each other. The bowl-shaped element is in this way angularly held stationary relative to the element 30 and the bayonet connection is locked in rotation.

The washer or closing plate 38 and the fixing ring 39 therefor are then placed in position so as to axially retain the tripod element and achieve a complete locking of the assembly.

The manner of assembling just described lends itself particularly well to mass-production without however adversely affecting the reliability and robustness of the assembly. Indeed, it will be observed that the ring 39 is sufficient to ensure the mechanical locking of the assembly without itself receiving the axial thrust from the shaft 44, since this thrust is absorbed directly by the pair of spherical surfaces 45a and 45b constituting the ball and socket connection between the bowl-shaped element 42 and the element 30. The locking is consequently perfectly reliable.

According to another feature, the centre $O_2$ of the spherical surfaces 45a, 45b constituting the ball and socket connection between the bowl-shaped element and the element 30 is axially offset relative to the centre $O_1$ of the mean lines of the runways in a direction toward the open end of the bowl-shaped element 42. The maximum operating angle of the joint is in this way increased since the relative angle between the shaft 44 and the shaft 42 is also smaller than the angle made by the shaft 44 with the hub 1. Moreover, in the extreme angular position, the centre of a roller is brought outside the bowl-shaped element and the disengagement of this roller is prevented by the fact that its inner surface bears against the corresponding shoulder 53 of the abutment member 50.

This increase, which may be of the order of 2° to 4°, is achieved practically without increase in cost and with for second advantage a reinforcement and a stiffening of the edge of the bowl-shaped element. This is quite the opposite of the situation in conventional structures in which an increase in angularity beyond 45° is always achieved to the detriment of strength or life.

It will also be observed that this new joint has a particularly interesting application in automobile vehicle wheel hubs, owing, on one hand, to its particularly small overall size, its slight heating in operation and, on the other hand, to the resulting reduction in cost and weight. These advantages are added to great robustness and to high reliability which are due in particular to a mechanical efficiency which is much higher than in conventional joints and hubs owing to the disposition of the rollers which are journalled on needles and roll along toric grooves.

Having now described my invention what I claim as new and desire to secure by Letters Patent is:

1. A homokinetic tripod joint comprising a first element connected to rotate with a tripod element which defines three trunnions, three spherical rollers rotatably and slidably mounted on the trunnions, and a second element defining three runways in which runways the rollers are engaged, the first element and the second element defining respectively concave and convex complementary spherical surfaces which cooperate with each other for forming a ball and socket connection, a bayonet connection means between said first and second elements, said connection means including a plurality of recesses in the concave spherical surface of the first element, said connection means further including a plurality of segments on the convex spherical surface of the second element, which segments are adapted to pass through said recesses during assembly to form, upon relative rotation of said first and second elements, said bayonet connection means, the connection between said tripod element and said first element constituting an auxiliary coupling and including means defining complementary teeth which teeth are disengageable from each other by a relative displacement of the teeth axially of the joint, said joint further including an axial abutment element between said rollers and said second element, said abutment element having a convex spherical surface having a shape complementary to said second element, said second element being disposed between said first element and said abutment element.

2. A joint according to claim 1, wherein the convex spherical surface of the second element is divided into three segments of a sphere which segments are separated by cavities and three recesses interrupt the concave spherical surface of the first element, said three recesses opening onto a free edge of the first element, the three recesses subtending an angle at the centre which is greater than an angle subtended at the centre by said segments of a sphere.

3. A joint according to claim 1, wherein the first element is open at an end thereof remote from the second element and is provided at said open end with means for axially retaining the tripod element.

4. A joint according to claim 3, wherein said tripod retaining means define an abutment of spherical shape for the tripod element and the tripod element comprises an abutment which has a spherical shape complementary to the shape of the abutment defined by the tripod retaining means and cooperative with the abutment of the tripod retaining means.

5. A joint according to claim 1, wherein said axial abutment element between the rollers and the second element includes shoulders which cooperate with an inner surface of the rollers so as to retain the rollers in the runways in respect of an extreme breaking angle of the joint.

6. A joint according to any one of the claims 1, 2, 3, 4 or 5, wherein the runways have a mean line in the shape of an arc of a circle having a centre which is located on an axis of the second element, the ball and socket connection between the first element and the second element having a centre which is offset with respect to the centre of the arc of a circle toward the open end of the second element.

7. An automobile vehicle wheel hub structure comprising a wheel-carrying element, a rolling bearing and a homokinetic tripod joint, said joint comprising a first element connected to rotate with a tripod element which defines three trunnions, three spherical rollers rotatably and slidably mounted on the trunnions, and a second element defining three runways in which runways the rollers are engaged, the first element and the second element defining respectively concave and convex complementary spherical surfaces which cooperate with each other for forming a ball and socket connection, a bayonet connection means axially interconnecting the first element and the second element and comprising a plurality of recesses in the concave spherical surface of the first element, said connection means further including a plurality of segments on the convex spherical surface of the second element, which segments are adapted to pass through said recesses during assembly to form, upon relative rotation of said first and second elements, said bayonet connection means, the connection in rotation between said tripod element and said first element constituting an auxiliary coupling and including means defining complementary teeth which teeth are disengageable from each other by a relative displacement of the teeth axially of the joint, said first element being integral with the wheel-carrying element and said second element being rigid with a transmission shaft, said joint further including an axial abutment element between said rollers and said second element, said abutment element having a convex spherical surface having a shape complementary to said second element, said second element being disposed between said first element and said abutment element.

* * * * *